United States Patent [19]

Hockings et al.

[11] Patent Number: 4,686,003
[45] Date of Patent: Aug. 11, 1987

[54] PRECIPITATION OF SCALE-FORMING MATERIALS FROM SOLUTION

[75] Inventors: William A. Hockings, Houghton; Duane M. Thayer, Chassell, both of Mich.

[73] Assignee: Board of Control of Michigan Technological University, Houghton, Mich.

[21] Appl. No.: 445,224

[22] Filed: Dec. 10, 1982

[51] Int. Cl.⁴ .............................................. B01D 1/00
[52] U.S. Cl. ........................... 159/47.3; 159/DIG. 13; 202/DIG. 1
[58] Field of Search ....................... 159/45, 47.1, 47.2, 159/47.3, DIG. 13; 202/DIG. 1; 210/696, 784, 353; 196/122

[56] References Cited

U.S. PATENT DOCUMENTS

| | | |
|---|---|---|
| 1,814,249 | 7/1931 | Hancock . |
| 1,940,955 | 12/1933 | Laird .................................. 196/122 |
| 2,022,054 | 11/1935 | Reed et al. .......................... 196/122 |
| 2,098,054 | 11/1937 | McBert . |
| 2,174,008 | 9/1939 | Mow . |
| 2,511,742 | 6/1950 | Shafer . |
| 2,735,807 | 2/1956 | Banker . |
| 2,812,541 | 11/1957 | Webster et al. ............. 159/DIG. 13 |
| 4,345,975 | 8/1982 | Abe et al. ................... 159/DIG. 13 |

FOREIGN PATENT DOCUMENTS 88209 12/1936 Sweden .............................. 159/47.3

OTHER PUBLICATIONS

Cuthbert et al.; "Stripping with Simultaneous Solids Generation Using Turbulent Bed Contactor"; presentation at the CIM Conference of Metallurgists; Aug. 28, 1978.

Primary Examiner—Charles Hart
Attorney, Agent, or Firm—Michael, Best & Friedrich

[57] ABSTRACT

Scale-forming metal oxides and carbonates, such as cupric oxide, can be precipitated from an ammoniacal leaching solution with minimum scale buildup by distilling the solution in an externally heated distillation chamber mounted for rotation about a generally horizontal axis. The distillation chamber includes a plurality of axially spaced annular baffles defining a plurality of compartments containing a tumbling medium, such as spherical balls. The solution is continuously introduced into the inlet end of the chamber and heated under pressure to a temperature above its boiling point as it flows over the baffles toward the outlet end of the chamber. A slurry containing the precipitated cupric oxide is continuously withdrawn from the outlet end and the evaporated gases are continuously withdrawn from the inlet end. The balls rub against each other, the interior of the chamber, and the sides of the baffles, as the chamber is rotated at a non-centrifuging speed, to provide a grinding or scrubbing action which minimizes a scale buildup of the precipitating cupric oxide.

9 Claims, 5 Drawing Figures

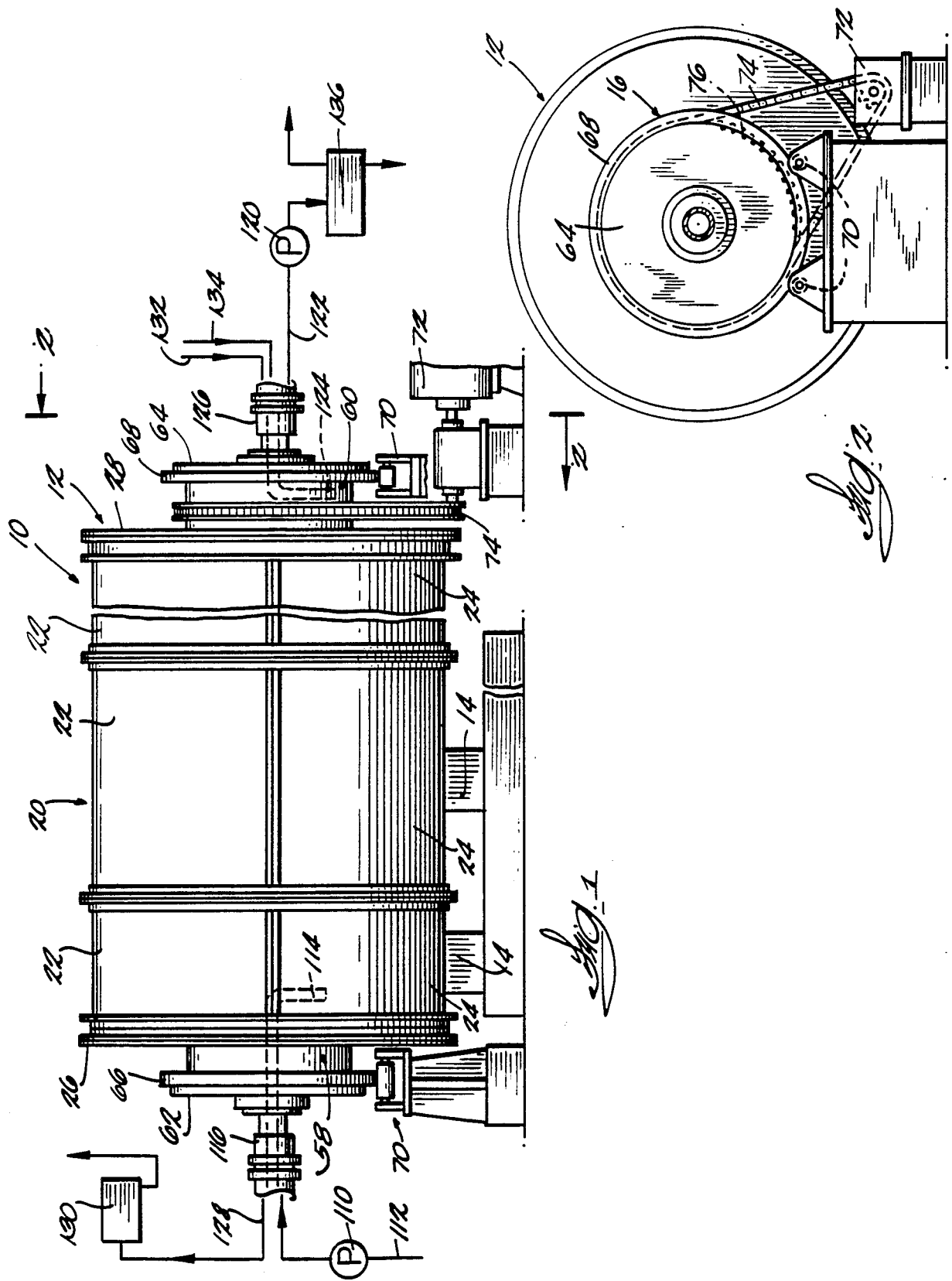

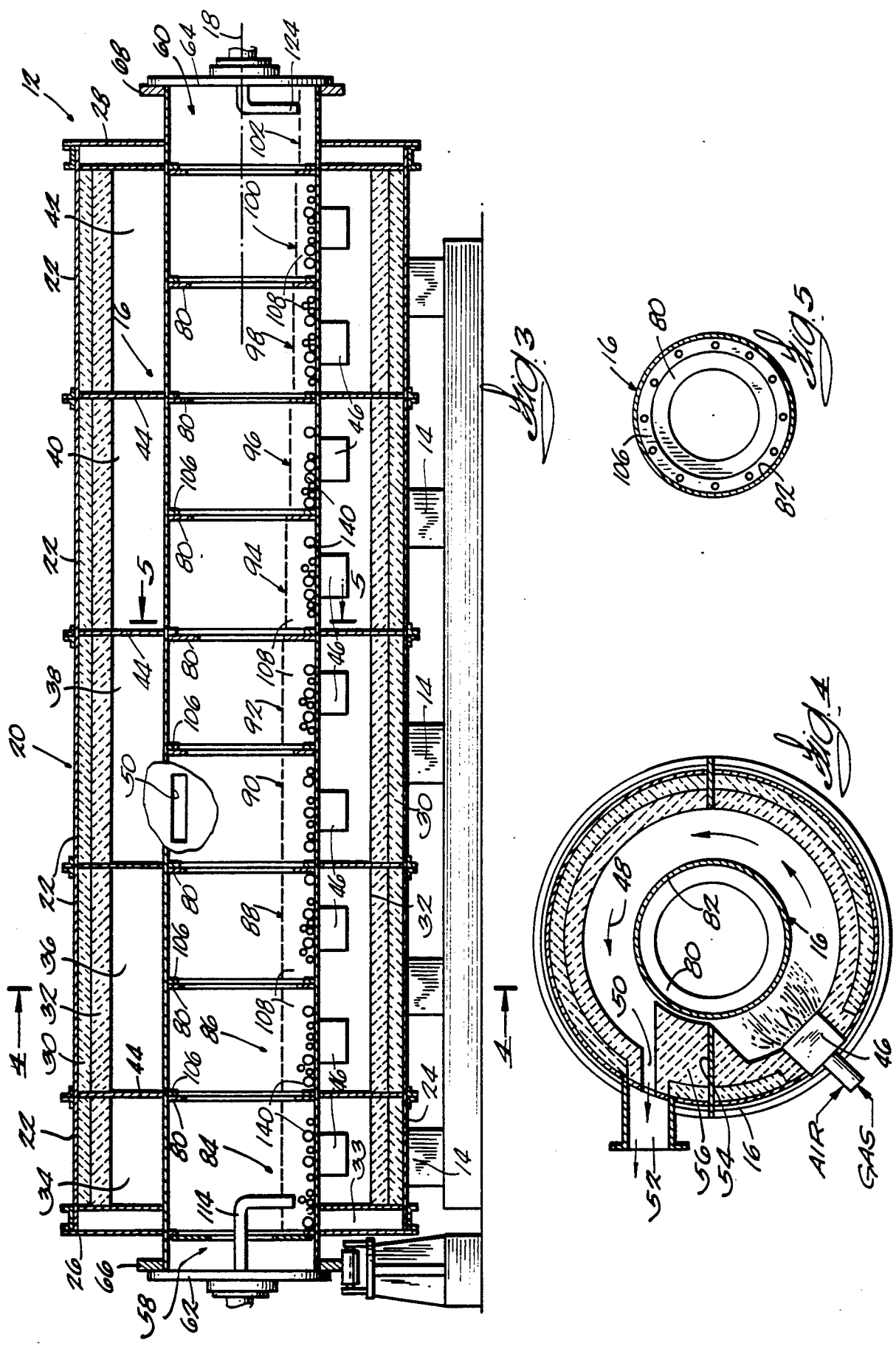

PRECIPITATION OF SCALE-FORMING MATERIALS FROM SOLUTION

This invention relates to a device and method for precipitating dissolved scale-forming materials from solution.

In recovery of certain metals, such as the recovery of copper and nickel from ores, metal oxides or carbonates are separated from gangue by an ammonia-carbon dioxide leaching process. A similar process is used as one of the steps in recovering metals from scrap materials, such as copper from printed circuit boards.

Such metal oxides or carbonates are commonly separated from the ammoniacal leaching solution by distillation. Severe maintenance and operational difficulties arise because the metal oxides and/or carbonates precipitating from the solution usually are scale-forming and tend to deposit and form a scale build-up on the interior surfaces of the distillation equipment. Consequently, packing columns, sieve plate columns, bubble cup plate columns and similar equipment used in other continuous distillation processes generally are not suitable because the scale-forming precipitate eventually causes plugging, requiring a shutdown to remove the scale.

Various attempts have been made to minimize this scale build-up problem, such as adding mechanical scrapers, providing some sort of agitation, coating the exposed surfaces with a synthetic plastic material, and using a series of kettles which are agitated by a countercurrent flow of steam. While these approaches have had some degree of success, most still permit some scale-buildup which eventually must be removed.

A paper entitled "Stripping With Simultaneous Solids Generation Using Turbulent Bed Contactor" and presented at the CIM Conference of Metallurgists at Montreal, Canada on Aug. 28, 1978, discloses another approach in which a so-called turbulent bed contactor is used for stripping ammonia from an ammoniacal solution containing nickel carbonate. Each tray in the tower includes a bed of plastic spheres constrained between vertically spaced supporting grids. Gases passing through the beds countercurrently to the liquid flow causes turbulent movement of the spheres which minimizes the deposit of solids on the spheres, the grids and the interior walls of the tower. However, an external source of steam is required to produce the necessary turbulence of the balls.

Rotary drums including a tumbling medium have been used for the distilling various liquids and as liquid reactors. Examples of such prior uses are disclosed in U.S. Pat. No. 1,814,249, 2,098,054, 2,174,008, 2,511,742 and 2,735,807. None of these patents discloses a distillation device arranged and operated in accordance with applicants' invention to precipitate a scale-forming material from solution with minimum scale buildup, while increasing the degree of the precipitation per unit of heat and obviating the need for external steam or the like.

SUMMARY OF THE INVENTION

One of the principal objects of the invention is to provide a simplified device and method for precipitating scale-forming materials from solution with minimum scale buildup.

Another of the principal objects of the invention is to provide such a device and method wherein the operating equipment and/or conditions can be conveniently adjusted to facilitate use in precipitating or crystallizing a wide variety of scale-forming materials from solution.

A further of the principal objects of the invention is to provide such a device and method wherein the solution is distilled in an externally heated distillation chamber and heat is transferred from the chamber to the solution at an increased rate.

A still further of the principal objects of the invention is to provide such a device and method which does not require the introduction of external steam into the distillation process.

Other objects, aspects and advantages of the invention will become readily apparent to those skilled in the art upon reviewing the following detailed description, the drawing and the appended claims.

The device provided by the invention includes an elongated, cylindrical distillation drum or chamber mounted for rotation about a generally horizontal axis and a plurality of axially spaced baffles extending radially inwardly from the interior wall of the distillation chamber, a tumbling medium disposed in the compartments comprising individual elements which are inert with respect to the solution and scale-forming precipitate being treated and which, in response to rotation of the distillation chamber, rub against each other, the interior walls of the chamber and the sides of the baffles, means for externally heating the chamber, and means for rotating the distillation chamber.

While the distillation chamber is being rotated at a non-centrifuging speed with respect to the solution and tumbling medium, the solution is continously introduced into an inlet end of the distillation chamber and is heated to a temperature above its boiling point to evaporate volatile materials and precipitate the scale-forming material from the solution as it flows over the baffles toward the outlet end of the distillation chamber. The tumbling medium provides a grinding or scrubbing action which minimizes scale build-up of the scale-forming precipitate. A slurry containing the scale-forming precipitate is continuously withdrawn from the outlet end of the distillation chamber and the evaporated gases are continuously withdrawn from the inlet end of the distillation chamber.

In a preferred embodiment, the radial heights of at least a portion of the baffles progressively decrease in a direction from the inlet toward the outlet and the level of the tumbling medium is the compartments is below the radial heights of the respective baffles so that solution overflows the baffles from one compartment to the next, thereby eliminating back mixing.

BRIEF DESCRIPTION OF THE DRAWINGS

FIG. 1 is a partial side elevation view of a distillation device of the invention and a diagrammatic representation of auxilliary equipment for practicing the method of the invention.

FIG. 2 is an end elevation view of the distillation device taken generally along line 2—2 in FIG. 1.

FIG. 3 is a sectional elevational view of the distillation device of FIG. 1 shown with the distillation chamber containing an ammonical leaching solution.

FIG. 4 is a sectional view taken generally along line 4—4 in FIG. 3.

FIG. 5 is a sectional view taken generally along line 5—5 in FIG. 3.

DESCRIPTION OF THE PREFERRED EMBODIMENTS

The distillation device and method provided by the invention is particularly suitable for the recovery of metal oxides and carbonates from ammoniacal leaching solutions in which scaling and fouling can cause severe maintenance and operational difficulties. Accordingly, it will be described in connection with recovering cupric oxide from an ammonical leaching solution. However, the device and method can be used in many other precipitation or crystallization systems where the prevention of scale build up is desirable.

Referring to the drawings, the distillation device 10 of the invention includes a generally cylindrical, stationary, outer housing 12 supported horizontally on a plurality of axially spaced legs 14 and a generally cylindrical distillation chamber or drum 16 extending through the outer housing 12 and mounted for coaxial rotation about a generally horizontal axis 18. The outer housing 12 serves as an insulated heating jacket for the distillation drum 16 in which an ammoniacal leaching solution containing extracted copper is heated to drive off ammonia, carbon dioxide and water and to precipitate cupric oxide as described in more detail below.

The outer housing 12 has a generally cylindrical outer shell assembly 20 comprised of a plurality of flanged, semi-cylindrical top and bottom segments 22 and 24 suitably fastened together by bolts (not shown) or the like. The shell assembly 20 also has end plates 26 and 28 including a central aperture through which the distillation drum 16 extends. The interior of the shell segments 22 and 24 are lined with two or more layers of an insulative, refractory material 30, 32 and the end plates 26 and 28 are lined with an insulative, refractory material 33.

The interior of the housing 12 is divided into a plurality of heating chambers 34, 36, 38, 40 and 42 by vertically extending strips 44 of barrier material, such as a 1-inch ceramic blanket. The exterior of the distillation drum 16 is heated by a plurality of gas-fired burners 46 mounted in the bottom portion of the shell assembly 20. The heating chambers 34, 36, 38, 40 and 42 are arranged so that each burner 46 heats a reasonably well defined zone of the distillation drum 16 and all the heating chambers includes two burners 46, except the first chamber 34.

Referring to FIG. 4, the burner flame is directed upwardly at an angle toward the outer surface of the distillation drum 16 and the exhaust gases circulate through the respective heating chamber in the direction of arrows 48. The exhaust gases are exhausted through a rectangular exhaust port 50 for each burner and into a stack 52. A horizontally extending strip 54 of barrier material, which can be the same material as the vertical barriers 44, separates the top and bottom portions of each heating chamber and a radially extending rib 56 of insulative, refractory material closely spaced from the outer surface of the distillation drum 16 deters recirculation of the exhaust gases.

With this arrangement, the rate of heating along the length of the distillation drum 16 can be varied if desired by simply adjusting the flow of gas and air to the individual burners 46. Fins can be provided on the outer surface of the distillation drum 16 to enhance heat transfer.

The inlet and outlet ends 58 and 60 of the distillation drum 16 are closed by respective end plates 62 and 64 and include radially extending flanges 66 and 68 which are rotatably supported on a pair of roller bearing assemblies 70. The distillation drum 16 is rotated, in the counter-clockwise direction as viewed in FIGS. 2 and 4, by a motor 72 which drives a chain 74 trained over a sprocket 76 mounted on the outlet end 60 of the distillation drum 16.

The distillation drum 16 includes a plurality of annular baffles 80 which are axially spaced at uniform intervals and extend radially inwardly from the interior wall 82 of the distillation drum 16 to define a plurality (e.g., 10) of compartments 84, 86, 88, 90, 92, 94, 96, 98, 100 and 102. The spacing between adjacent baffles 80 preferably generally corresponds with the heating zone for a burner 46. As best shown in FIG. 5, each baffle 80 is removably mounted by bolts or the like on a retention ring 106 fixably mounted on the interior wall 80 of the distillation drum 16. This permits baffles of different radial heights to be used when desired as explained in more detail below.

An ammoniacal leaching solution 108 containing copper is continuously introduced under pressure into the first compartment 84 of the distillation drum 16 via a pump 110 and a conduit 112. As a guide, this pressure can be about 10 to about 15 psig. The conduit 112 has an outlet 114 which extends through the inlet plate 62 and a rotary seal assembly 116 mounted on the inlet end plate 62. The solution 108 is maintained under pressure to insure precipitation of cupric oxide, rather than cupric carbonate, from the solution.

The burners 46 heat the solution to a temperature above its boiling point at that pressure as it flows over the baffles 80 toward the outlet end 60 of the rotating distillation drum 16. As a guide, this temperature usually is in the range of about 200 to about 250° F. Cupric oxide precipitates from the solution 108 as it is concentrated upon the evaporation of ammonia, carbon dioxide and water.

A concentrated slurry 118 containing the cupric oxide precipitate is continouously withdrawn from the last or recovery compartment 102 of the distillation drum 16 via a pump 120 and a conduit 122. The conduit 122 has an inlet 124 which extends through the outlet end plate 64 and a rotary seal assembly 126 mounted on the outlet end plate 64.

The evaporated gases ($NH_3$, $CO_2$ and water vapor) formed in the distillation drum 16 are withdrawn from the inlet end 58 of the distillation drum 16 via a conduit 128 extending through the rotary seal assembly 116. These gases can be condensed in a condensor 130 and recycled for reuse in the leaching process. Thus, the flow of the evaporating gases is countercurrent to the solution flow. A low volume flow of air can be introduced into the outlet end 60 of the distillation drum 16 through two small lines 132 and 134 extending through the rotary seal 126.

The slurry 118 from the distillation drum 16 is routed to a suitable device 136 for separating solids from a liquid, such as a filter or a centrifuge, to recover the cupric oxide.

Disposed in each of the compartments 84, 86, 88, 90, 92, 94, 96, 98 and 100 is a tumbling medium 140 comprised of a plurality of individual elements which rub against each other, the interior wall 82 of the distillation drum 16, and the sides of the baffles 80 to provide, during rotation of the distillation drum 16, a grinding or scrubbing action which prevents a scale build up of the precipitating cupric oxide. The tumbling medium 140 also provides areas for nucleation of the cupric oxide precipitate and the turbulence created in the solution 108 by its tumbling action increases the rate of heat transfer from the distillation drum wall 82 to the solution. The last or recovery compartment 102 preferably does not contain tumbling medium.

The tumbling medium is made from a material, such as steel or ceramic, which is inert with respect to the solution and the scale forming precipitate and preferably is somewhat softer than the mterial of the distillation drum 16 and the baffle 80 in order to minimize wear.

The tumbling medium 140 can have a variety of outer surface configurations so long as the desired scrubbing action is produced. Recessed or concave surfaces which might be "hidden" from rubbing with other elements and, therefore, sites for potential scale build up, should be avoided. Accordingly, a substantial portion of the outer surface of the tumbling medium 140 should be convex in order to promote random rolling or tumbling during rotation of the distillation drum 16. The tumbling medium 140 preferably is in the form of the spherical balls. The balls should be relatively small with respect to the space between the baffles 80 in order to insure a good scrubbing action and a mixture of balls of different sizes is preferred for that reason. As a guide, the balls can have diameters ranging from about ⅛ inch up to 1 ½ inches.

In order to provide the desired scrubbing or grinding action, the distillation drum 16 is rotated at a non-centrifuging speed with respect to the solution and the tumbling medium, that is, at a speed below which the tumbling medium 140 and/or the solution 108 is held against the interior wall 82 of the distillation drum 16. As a guide, for a distillation drum 30 feet long and having an inside diameter approximately 4 feet, the speed of rotation usually will be in the order of 10–20 revolutions per minute. The tumbling medium 140 can serve to grind the scale-forming precipitate to a predetermined size by varying the amount, composition, size and hardness of the tumbling medium and the rotational speed of the distillation drum.

The baffles 80 can serve to prevent back mixing of the solution as it flows through the distillation drum 16. In the preferred embodiment illustrated, the tumbling medium 140 in each of the compartments, 84, 86, 88, 90, 92, 94, 96, 98, and 100 is below the radial heights of the respective baffles 80 and the radial heights of the baffles 80 in at least the last half of the distillation drum progressively decrease in a direction toward the outlet end 60. This arrangement minimizes back mixing, but does permit some scale build up on the edges of the baffles 80, the extent of which depends on the level of the tumbling medium 140 relative to the radial height of the baffles 80.

The majority of precipitation usually occurs in the first half of the distillation drum 16 and substantially only evaporation of the volatile material takes place in the last half. Thus, in the specific construction illustrated, the baffles 80 in the first half of the distillation drum 16, where back mixing is a lesser concern, have a uniform radial height which is less than that of the baffle separating compartments 94 and 94. The radial heights of the baffles 80 in the last half of the distillation drum 16, where back mixing is a greater concern, progressively decrease and the solution overflows the baffles from one compartment to the next. If desired, the radial heights of the baffles 80 can progressively decrease along the entire length of the distillation drum 16 so that the solution overflows the baffles from each compartment to the next.

The level of the tumbling medium 140 in each compartment preferably is below the radial heights of the respective baffles as illustrated. It can be above the radial heights of the baffles 80 to prevent scale build up on the edges of the baffles. However, this permits some back mixing which may outweigh the advantage of eliminating scale build up in some cases. The level of the tumbling medium 140 and the depth of the solution 108 along the length of the distillation drum 16 can be controlled by inclining the rotational axis downwardly in a direction from the inlet end toward the outlet end at a small angle in the order of about 5° from the horizontal. The radial heights of the baffles 80 can be varied to adjust the retention time of the solution in the distillation drum. This adjustment can be accomplished by simply removing one set of the removably mounted baffles and replacing it with another set of baffles having the desired radial heights.

Heat sources other than gas burners can be used, for example, electrical resistance heaters or a steam jacket. With suitable enclosures and rotary seal assemblies on the inlet and outlet ends of the distillation drum 16, the device can be operated under vacuum conditions as well as under pressure as described above.

From the foregoing description it can be seen that the distillation device and method provided by the invention have several advantages. A wide variety of scale-forming materials can be efficiently precipitated or crystallized from solution with little or no scale formation because of the nucleation sites and scouring action provided by the tumbling medium. The turbulent action of the tumbling medium increases the degree of the precipitation per unit of heat. External liquids, such as steam, which can upset the water balance are not required as is the case with some prior systems. The precipitate can be conveniently ground to a predetermined particle size by adjusting the amount, composition, size and hardness of the tumbling medium and the rotational speed of the distillation drum.

Without further elaboration, it is believed that one skilled in the art can, using the preceding description, utilize the present invention to its fullest extent. The following example is presented to exemplify a preferred embodiment of the invention and should not be construed as a limitation thereof.

EXAMPLE

The following operating parameters are typical for recovering cupric oxide from an ammoniacal leaching solution used to extract copper from a scrap materail, such as printed circuit boards.

| Distiller Drum Dimensions | |
| --- | --- |
| Length, ft. | 30 |
| Inside diameter, ft. | 4 |
| Distiller Drum Operation | |
| Temperature, °F. | 200–250 |
| Pressure, psig | 10–15 |
| Rotational speed, rpm | 14 |
| Tumbling medium | mixed steel and ceramic balls, ⅛ in. and 1½ inch diameter |
| Solution In (Conduit 112) | |
| Feed rate, gpm | 10.25 |
| Composition, wt. % | |
| $NH_3$ | 6.0 |

-continued

| | |
|---|---|
| CO₂ | 4.0 |
| Cu⁺⁺ | 5.5 |
| Water | 84.5 |
| Slurry Out (Conduit 122) | |
| Withdrawal rate, gpm. | 5 |
| Composition, wt. % | |
| NH₃ | 0.5 |
| CO₂ | 0.3 |
| Cu⁺⁺ | 0.5 |
| CuO | 5.0 |
| Water | 93.7 |
| Vapors Out (Conduit 128) | |
| Flow rate, lbs/hr | 2559 |
| Pressure, psig | 10 (max) |
| Composition, mole % | |
| NH₃ | 11.4 |
| CO₂ | 7.6 |
| Water | 81.0 |

From the foregoing description, one skilled in the art can easily ascertain the essential characteristics of the invention and, without departing from the spirit and scope thereof, make various changes and modifications to adapt it to various usages.

We claim:

1. A method for precipitating dissolved scale-forming material from a solution including the steps of:
   (a) providing an elongated, cylindrical distillation chamber mounted for rotation about a generally horizontal axis and including a plurality of axially spaced annular baffles extending radially inwardly from the interior wall of said chamber at a height less than the inside radius of said chamber to define a plurality of compartments;
   (b) providing a tumbling medium in the compartments comprising individual elements which are inert with respect to the solution and the scale-forming material and which rub against each other, the interior walls of the chamber and the sides of the baffles in response to rotation of the chamber;
   (c) rotating the chamber at non-centrifuging speed with respect to the solution and the tumbling medium;
   (d) continuously introducing the solution into an inlet end of the chamber in a sufficient quantity to flow over the baffles toward the opposite, outlet end of said chamber;
   (e) heating the solution in the chamber above its boiling point to evaporate a portion of the volatile materials and precipitate the scale-forming material from the solution as it flows through the chamber;
   (f) continuously withdrawing a slurry containing the precipitated scale-forming material from the outlet end of the chamber; and
   (g) continuously withdrawing gases evaporating from the solution from the inlet end of the chamber to thereby provide countercurrent flow of the evaporated gases and the solution.

2. A method according to claim 1 wherein the level of the tumbling medium in the compartments is below the radial heights of the respective baffles and the radial heights of at least a portion of the baffles progressively decrease in a direction from the inlet end toward the outlet end of the chamber so that the solution overflows said baffles from one compartment to the next.

3. A method according to claim 2 wherein the tumbling medium is in the form of spherical balls.

4. A method according to claim 2 wherein the solution is an aqueous, ammoniacal leaching solution containing copper, ammonia and carbon dioxide, the chamber is heated to a temperature of about 200° to about 250° F. and is maintained at a pressure of about 10 to about 15 psig, the gases withdrawn from the inlet end of the chamber contain ammonia, carbon dioxide and water vapor, and the slurry withdrawn from the outlet end of the chamber contains cupric oxide.

5. A method according to claim 4 including the further step of:
   (h) separating cupric oxide from the slurry withdrawn from the outlet end of the chamber.

6. A method according to claim 1 wherein the level of the tumbling medium in the compartments is above the radial heights of at least some of the respective baffles.

7. A method according to claim 1 wherein the rotational axis of the chamber is at a slight downward incline in the direction from the inlet and toward the outlet end of the chamber.

8. A method according to claim 7 wherein the radial heights of the baffles are substantially uniform.

9. A method according to claim 1 wherein the tumbling medium is made from a material which is softer than that of the chamber interior wall and the baffles so as to minimize wear.

* * * * *